United States Patent
Johnson et al.

(10) Patent No.: US 11,947,712 B2
(45) Date of Patent: Apr. 2, 2024

(54) SECURE IDENTIFICATION OF WAFER AND CHIP

(71) Applicant: International Business Machines Corporation, Armonk, NY (US)

(72) Inventors: Richard C. Johnson, Selkirk, NY (US); Alex Richard Hubbard, Rensselaer, NY (US); Vinay Pai, Albany, NY (US); Cody J. Murray, Burnt Hills, NY (US); Fee Li Lie, Albany, NY (US); Nikhil Jain, Albany, NY (US)

(73) Assignee: International Business Machines Corporation, Armonk, NY (US)

( * ) Notice: Subject to any disclaimer, the term of this patent is extended or adjusted under 35 U.S.C. 154(b) by 80 days.

(21) Appl. No.: 17/485,999

(22) Filed: Sep. 27, 2021

(65) Prior Publication Data

US 2023/0094707 A1    Mar. 30, 2023

(51) Int. Cl.
*H04L 29/00*    (2006.01)
*G06F 21/73*    (2013.01)

(52) U.S. Cl.
CPC .................................. *G06F 21/73* (2013.01)

(58) Field of Classification Search
CPC ....................................................... G06F 21/73
USPC ............................................................. 726/5
See application file for complete search history.

(56) References Cited

U.S. PATENT DOCUMENTS

| | | | |
|---|---|---|---|
| 9,019,567 B2 | 4/2015 | Cowburn | |
| 9,742,563 B2 * | 8/2017 | Gotze | .................... H04L 9/0866 |
| 9,767,244 B2 * | 9/2017 | Haffner | ........... H01L 21/823437 |
| 9,811,723 B2 | 11/2017 | Rosset | |
| 10,310,490 B2 | 6/2019 | Buhl | |
| 10,522,472 B2 * | 12/2019 | De Langen | .......... G06K 7/1417 |
| 11,079,337 B1 | 8/2021 | Lie | |

FOREIGN PATENT DOCUMENTS

| | | |
|---|---|---|
| DE | 10065537 A1 | 8/2002 |
| JP | 2008218594 A | 9/2008 |

* cited by examiner

*Primary Examiner* — Jeffrey C Pwu
*Assistant Examiner* — Michael D Anderson
(74) *Attorney, Agent, or Firm* — Donald J. O'Brien

(57) ABSTRACT

Embodiments are disclosed for a method. The method includes generating a correction datastore indicating shifts in magnitude representing corresponding characters that uniquely identify hardware comprising a computer processing chip. The method further includes generating security masks based on a correction file. Additionally, the method includes using a correction process for the computer processing chip. The generated security masks include corresponding overlays representing the shifts in magnitude with respect to corresponding product masks for the computer processing chip. The method also includes generating the computer processing chip using the security masks and the product masks.

20 Claims, 7 Drawing Sheets

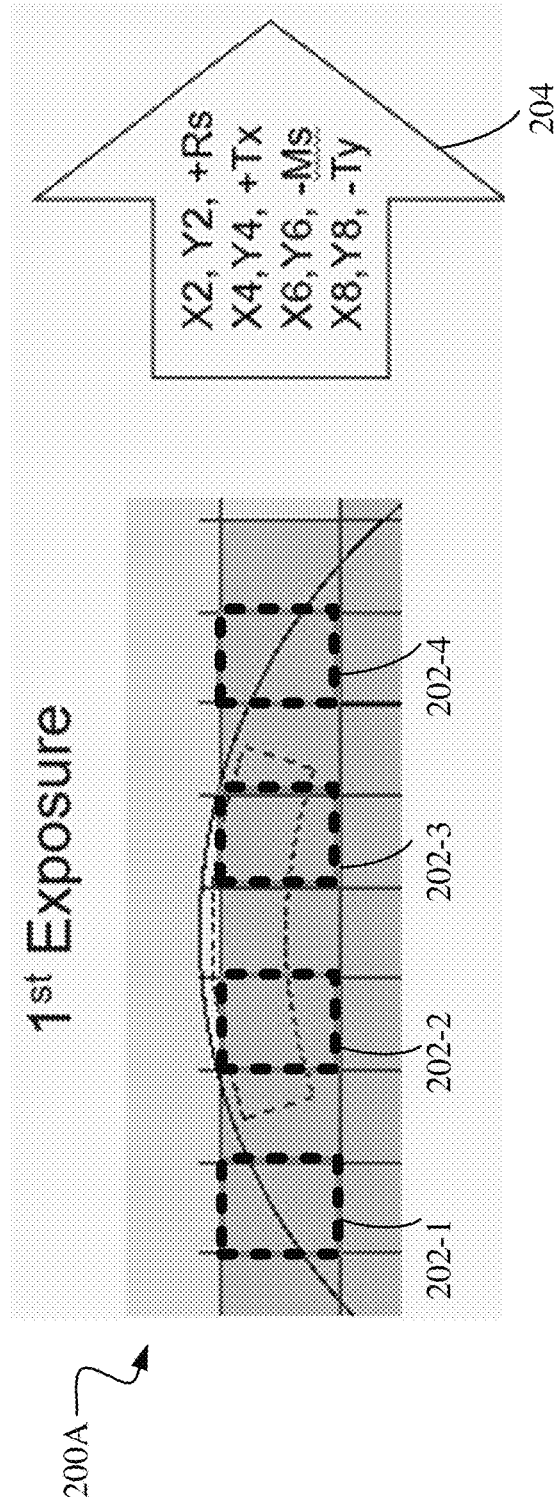
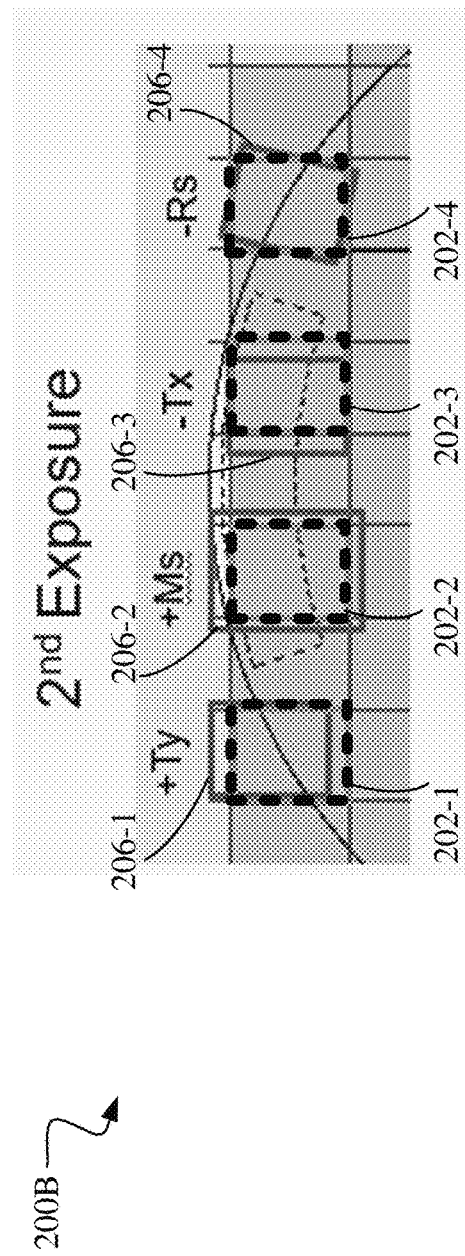
FIG. 2A
FIG. 2B

US 11,947,712 B2
// 1

SECURE IDENTIFICATION OF WAFER AND CHIP

BACKGROUND

The present disclosure relates to secure identification, and more specifically, to secure identification of a wafer and chip.

In manufacturing complex integrated circuits, like computer processor cores, systems on chips, and memory devices, a number of foundries may fabricate and interconnect layers of electrically conductive circuits into a non-conductive medium, such as a sliced wafer of silicon. In this way, the wafer may hold the layers of the integrated circuit in place. These layered masks can be photographic exposures of lines and gates printed in electrically conductive material that can power and operate the integrated circuit.

SUMMARY

Embodiments are disclosed for a system. The system includes a wafer having a plurality of computer processing chips. Each of the computer processing chips includes a product mask configured to perform one or more functions of the computer processing chips, and a security mask having a dummy mask. The security mask is configured to represent an identifier, and is disposed in a predetermined shift with respect to the product mask. Additionally, a magnitude of the predetermined shift represents a character of the identifier.

Embodiments are disclosed for a method. The method includes generating a correction datastore indicating shifts in magnitude representing corresponding characters that uniquely identify hardware comprising a computer processing chip. The method further includes generating security masks based on a correction file. Additionally, the method includes using a correction process for the computer processing chip. The generated security masks include corresponding overlays representing the shifts in magnitude with respect to corresponding product masks for the computer processing chip. The method also includes generating the computer processing chip using the security masks and the product masks.

Further aspects of the present disclosure are directed toward systems and computer program products with functionality similar to the functionality discussed above regarding the computer-implemented method. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 2A is a block diagram of an example wafer and chip and a correction per exposure (CPE) datastore, in accordance with some embodiments of the present disclosure.

FIG. 2B is a block diagram of an example wafer and chip, in accordance with some embodiments of the present disclosure.

Figure 1:
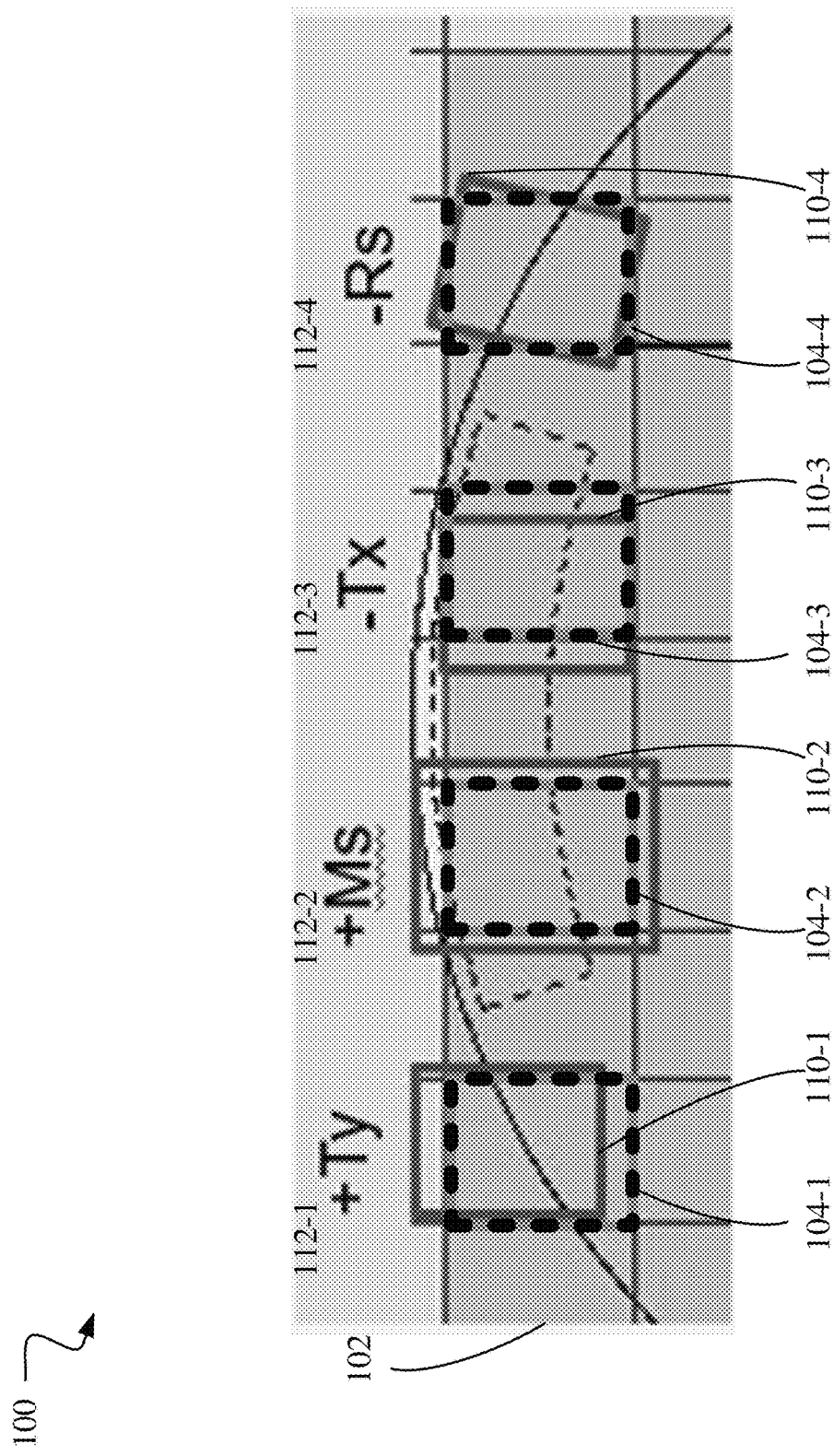
FIG. 1 is a block diagram of an example wafer and chip with secure identification, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the embodiments described. On the contrary, the intention is to cover all modifications, equivalents, and alternatives falling within the spirit and scope of the present disclosure.

DETAILED DESCRIPTION

As stated previously, different foundries may overlay different series of masks to manufacture an integrated circuit, such as the microprocessor cores of a chip. Thus, in a foundry context, there can be multiple points throughout the workflows of design and fabrication where a malicious actor may introduce a malicious feature into the chip hardware. For example, a malicious actor may substitute compromised wafers into the workflow which could alter the final functions of the chip. While the foundries may have verification processes to detect compromised chips, the verification of the chip design may not happen until the fabrication has started, or even completed. At this point however, the foundries have already wasted considerable costs in the manufacture of a potentially worthless, compromised chip.

Further, an untrusted foundry model can compromise the chip fabrication by making slight changes from the design at one or more points during fabrication. However, each foundry may merely provide sampling for verification, and not a more comprehensive design verification. As such, the foundry's verification may not identify some compromised chips. Further, some malicious features may be configured to make the work involved in detection (at final test) a problem that is not trivial, or in some cases, not solvable. As stated previously, in a foundry environment, there are multiple points throughout the workflows of design and fabrication during which a malicious actor may introduce a malicious feature into the chip hardware itself. In some cases, malicious actors may intercept chips between foundries, replacing the chips with compromised chips.

However, each foundry may merely provide sampling of inline metrology data on the chip for verification, and not a more comprehensive design verification. As such, the foundry's verification may not identify some compromised chips. Further, some malicious features may be configured to make the work involved in detection (e.g., at final test) a problem that is not trivial. In some cases, it may not be mathematically possible (i.e., solvable) to detect malicious features. As such, there may not be a way to verify that the inline metrology data, provided by the foundry, actually comes from chips on the fabricated wafer. Inline metrology can refer to the lines of the integrated circuit, their lengths, positions, and distances between each other. Accordingly, verifying the wafer ID may be limited to a conventional ID sticker on the back of the wafer, which may not be secure from tampering.

Accordingly, some embodiments of the present disclosure may fabricate wafers and chips in a way that makes it possible to verify, throughout the fabrication workflow, the security of a wafer and/or chip. Fabricating wafers and chips in this way can involve printing a security mask in the integrated circuit itself (and/or the wafer) that provides information about the wafer and/or chip, such as an encoded identifier. According to some embodiments of the present disclosure, the security mask can include a series of predetermined, non-functional overlay marks printed in a correction process. These overlay marks can include a series of intentional shifts that vary from the underlying product mask, and are detectable by conventional metrology (at level or subsequent level). Accordingly, it may be possible to derive this information by decoding the overlay marks using a predetermined model that maps differences between the security mask and product mask. In this way, it may be possible to use the predetermined overlay marks for secure design verification and/or inspection. Further, manufacturing chips and wafers in this way may make it possible to: verify that a wafer returning from another foundry has not been tampered with; and, identify counterfeited duplicates. Additionally, without knowing the mapping between the predefined correction embedded into the wafer and/or chip, it may not be possible for a malicious actor to introduce a counterfeit chip with malicious designs into the fabrication workflow.

In these ways, some embodiments of the present disclosure may improve the technology of chip and wafer manufacture by improving the security of chips and wafers throughout fabrication workflows. Further, such embodiments may protect the value of chips and wafers by protecting them against unlicensed duplication.

FIG. 1 is a block diagram of an example wafer and chip 100 with secure identification, in accordance with some embodiments of the present disclosure. The example wafer and chip 100 includes a gridded silicon wafer 102 and product masks 104-1 through 104-4 (collectively referred to herein as product masks 104). The product masks 104 may be one layer of an integrated circuit, as described above.

For each of the product masks 104-1 through 104-4, there is a corresponding security mask 110-1 through 110-4 (collectively referred to as security masks 110). More specifically, the security masks 110 may represent predetermined shifts of the corresponding product masks 104. In combination, the security masks 110 may represent a distorted dummy pattern, that a foundry or purchasing client can use to validate the security of the wafer and chip 100. The term, dummy, refers to the security mask's non-functionality. In other words, even though the security masks 110 are printed on the product mask 104, the security masks 110 may not be electrically connected to the integrated circuit. According to some embodiments of the present disclosure, a foundry can generate the security masks 110 on the wafer and chip 100 using Using industry standard overlay correction techniques, such as correction per exposure (CPE) applied to a second exposure. Further, the foundry can separately generate security masks 110 on the wafer or the chip. Herein, the security masks 110 are also referred to as a security mask. According to some embodiments of the present disclosure, the security mask has no feature content, meaning the security mask does not add to the actual circuitry of the product mask 104. The foundry merely prints predetermined marks as a security key. For example, each mark (or, set of marks) may represent a character in an identifier, such as a chip or wafer ID. Thus, an originating foundry may print a product mask 104 with a security mask, having a part number encoded in the security masks 110. The originating foundry may thus verify that a wafer returning from another foundry is the same by looking for, and reading the security-mask-marks to the product-mask-marks using inline metrology. Accordingly, a wafer with a security mask 110, having the same part number encoded in the security masks 110, is the same wafer. In contrast, a product mask 104 without the security mask, or with different security masks 110, is counterfeit. According to some embodiments of the present disclosure, the foundry may print these security masks 110 across the chip and/or the wafer.

The type of shifts may vary for each of the security masks 110, as shown by the corresponding labels 112. Label 112-1 represents the +Ty shift. The +Ty shift can represent a shift in the y direction of magnitude, +Ty. Thus, the security mask 110-1 is disposed in a positive y direction from the position of the corresponding product mask 104. Similarly, label 112-2 represent the +Ms shift. The +Ms shift can represent a shift in size, of magnitude, +Ms. Thus, the security mask 110-2 represents a magnification in size from the corresponding product mask 104-2. As shown, the security mask 110-2 is centered at the same location as, and surrounding, the corresponding product mask 104-2. Further, the label 112-3 represents the −Tx shift. The −Tx shift can represent a shift in the x direction. Thus, the security mask 110-3 is disposed in a negative x direction, of magnitude −Tx, from the position of the corresponding product mask 104-3. With respect to the label 112-4, which represent the −Rs shift, the −Rs shift can represent a rotational shift of the corresponding product mask 104-4. Thus, the security mask 110-4 represents a rotation of a specified magnitude, −Rs, with respect to the corresponding product mask 104-4. The shifts mentioned herein are merely examples of potential shifts. The types of shifts may vary and include more shift types than described here.

According to some embodiments of the present disclosure, the magnitude of the shift between the product mask and the security mask may represent an encoded character of an identifier. Thus, the foundry may encode a wafer ID using security masks on each of multiple product masks 104. The security masks include security masks 110, each having different shift magnitudes. These shift magnitudes may represent predetermined characters that can be determined using a predetermined algorithm and/or mapping model. In this way, a foundry may use the security masks 110 with intentional shifts to encode information onto the wafer and chip 100 that a foundry or customer can read out using conventional inline metrology. According to some embodiments of the present disclosure, the foundries can print the security masks 110 at the same time as the product mask, thus mitigating any impact on the productivity of the fabrication tools. Further, a foundry can use a lithography tool having correction per exposure capability in order to flexibly write different shifts at different magnitudes to each wafer and/or exposure (e.g., mask). In this way, the set of shift magnitudes can be correlated to a waferID, chip ID, and/or other security-related parameters and devices.

Accordingly, at any point after, in the fabrication workflow, it is possible to look for the security masks 110, measure these marks in subsequent layers of the product mask, and in comparison to the corresponding product masks 104, and thus, determine the magnitude of the shifts.

Further, some embodiments of the present disclosure may provide modeling that maps the determined magnitudes to corresponding characters. For example, using inline metrology, it is possible to determine the following shifts from example security masks: x translation of 1, y translation of 2, rotation of 3, magnification of 27, rotation of 28, and magnification of 29. Accordingly, the modeling may map magnitudes to characters as shown in EXAMPLE MAPPING 1:

| MAGNITUDE | CHARACTER |
|---|---|
| 1 | A |
| 2 | B |
| 3 | C |
| ... | |
| 27 | 1 |
| 28 | 2 |
| 29 | 3 |

Example Mapping 1

In this way, these example security masks may encode a WaferID of, "ABC123." Thus, by using raw data that shows the shift from the product mask to the security mask, it is possible to derive an encoded identifier using conventional data modeling. The encoding can use the same algorithm as the decoding, whereby the encoding encodes information into the wafer and/or chip and decoding pulls the encoded information back out. While this example merely includes six terms (i.e., characters), some embodiments of the present disclosure can include more terms.

FIG. 2A is a block diagram of an example wafer and chip 200A and a security mask process correction (SMPC) datastore 204, in accordance with some embodiments of the present disclosure. The example wafer and chip 200A is similar to the example wafer and chip 100, described with respect to FIG. 1. Similar to example wafer and chip 100, the example wafer and chip 200A includes multiple product masks 202-1 through 202-4 (collectively referred to as product masks 202). In contrast to the example wafer and chip 100, which has had two exposures, the example wafer and chip 200A do not include security masks because the example wafer and chip 200A has not had a first exposure. Rather, the wafer and chip 100 may enter an exposure tool (not shown), which exposes an initial pattern without any modifications. In this way, the first exposure may lay down a mask of the product masks 202.

The arrow encompassing SMPC datastore 204 may indicate offsets for a second exposure. In some embodiments of the present disclosure, the SMPC datastore 204 may be a CPE correction set. Further, some embodiments of the present disclosure may generate the SMPC datastore 204 using a predetermined algorithm that parses an identifier, such as the WaferID, ChipID, or other identifying information into the modelled overlay offset components for linear process corrections (PC), high order process corrections (HOPC), or CPE. In this example, the SMPC datastore 204 include x and y variables for rotation (+Rs), x (+Tx), magnification (−Ms), and y (−Ty) shifts.

FIG. 2B is a block diagram of an example wafer and chip 200B, in accordance with some embodiments of the present disclosure. The example wafer and chip 200B may represent the example wafer and chip 200A after a second exposure. The second exposure may be limited to overlay marks printed with a corrections technique, such as PC, HOPC, CPE, and the like. Accordingly, the example wafer and chip 200B can include product masks 202 (e.g., 202-1, 202-2, 202-3, and 202-4) and security masks 206 (e.g., 206-1, 206-2, 206-3, and 206-4), which include the overlay marks from the second exposure. Additionally, the security masks 206 can be printed in the same pass as the product masks 202 or in a separate pass with additional noise. Since the security masks 206 are printed at the same level as the product mask 202, any changes due to processing will be equivalent between the first and second exposure. In this context, changes refer to prior level process induced, or additional errors due to the wafer alignment. If, run at the same time, the wafer alignment error is the same for both. However, if run separately, the wafer-alignment-run-2-run-error may be included.

The foundry may thus use the second exposure to overlay the security masks 206 on the example wafer and chip 200A that is a modification of the mask of the underlying product masks 202. This modification represents the shifts specified by the SMPC datastore 204. The magnitude of these offsets can each represent a character in a security parameter, such as a wafer ID. Correction per exposure is an industry standard correction method that can be used to remove static tool-to-tool grid components. It is thus possible to use CPE to generate a security mask in a way that distorts a corresponding product mask 202. However, CPE may involve high sampling, which is a disincentive to use. As a result, these components may remain static or change slowly over time. As such, security parameters encrypted in this way are not likely to change much over time, thus making it easier to decrypt these codes over successive generations of chips.

According to some embodiments of the present disclosure, the SMPC datastore 204 can be physical files on the scanner, or passed to the scanner via semi equipment communications standard (SECS)/generic equipment model (GEM) at lot start. Further, the CPE datastore 204 may include parameter values separated by multiple parameters. Some example parameters can include a tool, chuck, lot-ID, wafer-ID, reticle-ID, layer-ID, and image-ID, for example.

Figure 3:
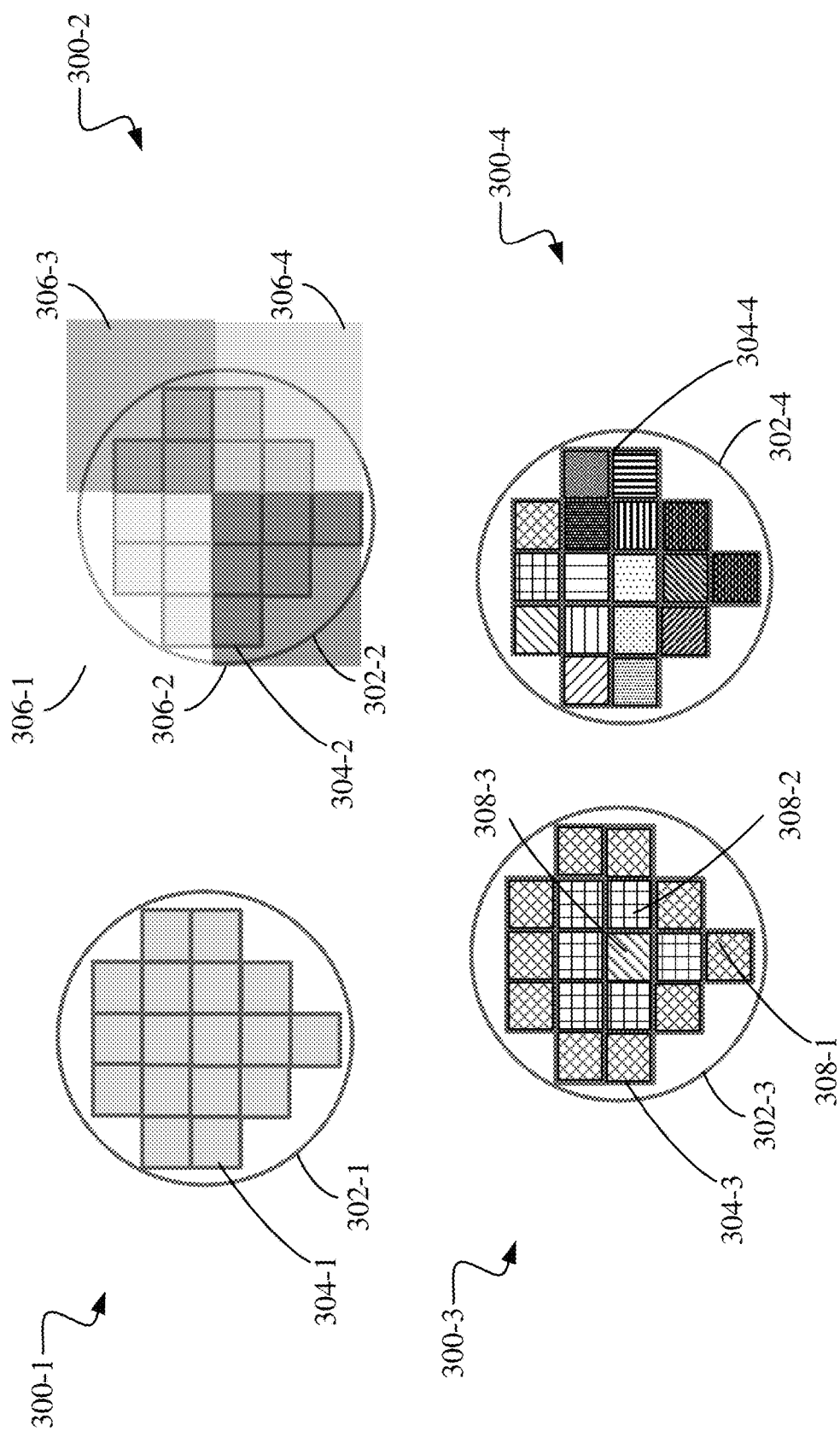
FIG. 3 is a block diagram of example wafers and chips, in accordance with some embodiments of the present disclosure.

FIG. 3 is a block diagram of example wafers and chips 300-1 through 300-4, in accordance with some embodiments of the present disclosure. Herein, the example wafers and chips 300-1 through 300-4 are collectively referred to as example wafers and chips 300. Each of the example wafers and chips 300-1 through 300-4 respectively include example wafers 302-1 through 302-4 and example chips 304-1 through 304-4 (collectively referred to as wafers 302 and chips 304). Each of the example wafers 302 include multiple example chips 304. Further, the example wafers and chips 300 are similar to the example wafer and chip 100, described with respect to FIG. 1. In these examples, the example wafers and chips 300 represent different techniques for encoding identifiers. More specifically, the printing of security masks may vary across the example chips 304 on each of the example wafers 302.

In the example wafer 302-1, each of the example chips 304-1 may include the same security masks to encode the wafer ID. Thus, the chips 304-1 provide an example where the same security mask is applied to all the chips 304-1 on the wafer 302-1. Further, each of the chips 304-1 could include multiple security masks printed at different places in fabrication, which may involve multiple reticles.

In contrast, in the example wafer 302-2, the example chips 304-2 may include different security masks across different quadrants 306-1 through 306-4 of the wafer 302-2.

In the example wafer 302-3, each radius 308-1 through 308-3 of example wafer 302-3 has different security masks for the respective chips 304-3 to encode unique information, such as Wafer ID, tool ID, fabrication foundry, and the like. In the example wafer 302-4, each of the example chips 304-4 may have different security masks to encode unique information. Accordingly, decoding the unique information may involve having knowledge of the chip geography from the example wafer 302-4.

Figure 4:
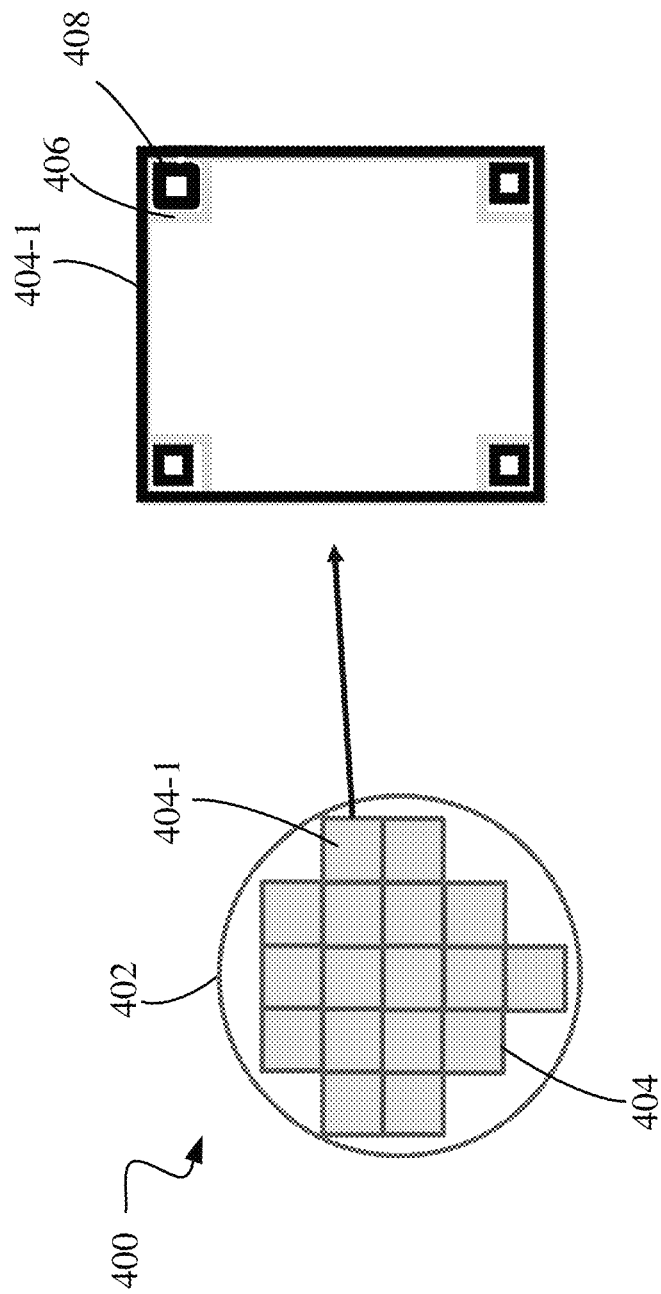
FIG. 4 is a block diagram of an example wafer and chip, in accordance with some embodiments of the present disclosure.

FIG. 4 is a block diagram of example wafer and chip 400, in accordance with some embodiments of the present disclosure. The example wafer and chip 400 may be similar to the example wafer and chip 100, described with respect to FIG. 1. Further, the example wafer and chip 400 may include an example wafer 402 and example chips 404. Additionally, the example chips 404 may include example chip 404-1, which is represented in more detail at the end of the line from chip 404-1. The example chip 404-1 includes anchors 406 and targets 408. The anchors 406 may physically anchor the chip 404-1 to the wafer 402. Additionally, the targets 408 may represent surrogates for determining the shift of the security masks printed on chip 404-1. In other words, instead of printing and decoding the security masks with respect to a shift to the product mask, some embodiments of the present disclosure may print and decode the security mask with respect to a shift on the target 408.

Additionally, the wafer and chip 400 includes both the product mask and security mask in a single mask. Further, according to some embodiments of the present disclosure, both the product mask and security mask can be printed in the same pass by a fabrication tool (without any process corrections like CPE). As a result, the same encoded information can be included on every chip and/or every wafer.

Figure 5:
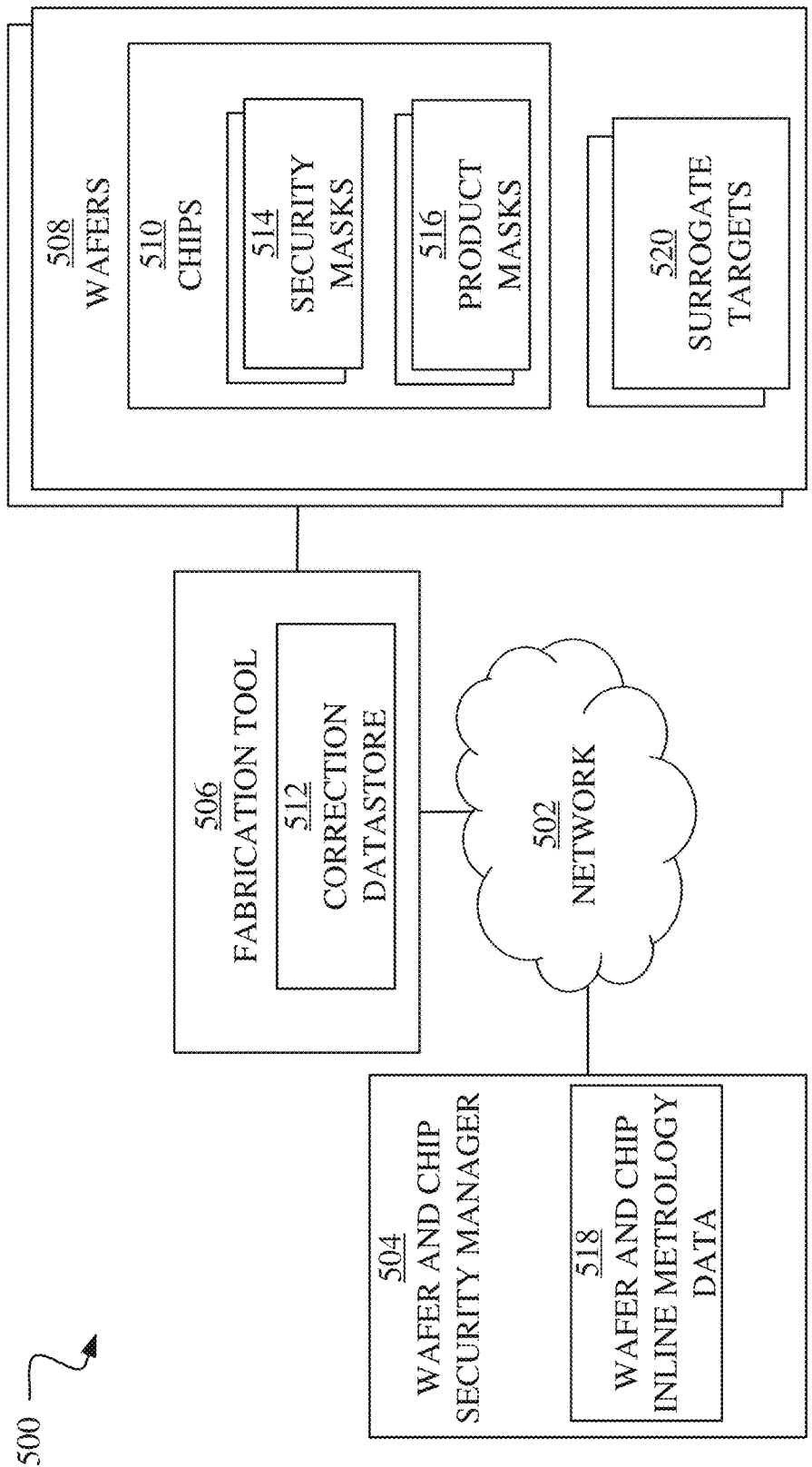
FIG. 5 is a block diagram of an example system for secure identification of wafer and chip, in accordance with some embodiments of the present disclosure.

FIG. 5 is a block diagram of an example system 500 for secure identification of wafer and chip, in accordance with some embodiments of the present disclosure. The example system 500 includes a network 502, wafer and chip security manager 504, fabrication tool 506, and wafers 508. The network 502 may be a local area network, wide area network, or collection of computer communication networks that facilitates communication between components of the example system 500, specifically, between the wafer and chip security manager 504 and fabrication tool 506. In some embodiments, the network 502 can be the Internet.

The fabrication tool 506 can be a chip manufacturing toolset that fabricates chips 510 on wafers 508. The chips 510 may include multiple cores of integrated circuits that the fabrication tool 506 layers together within a wafer 508. Additionally, the fabrication tool 506 may use a correction process, such as CPE. Accordingly, in some embodiments of the present disclosure, the wafer and chip security manager 504 may use CPE to provide secure identification for the wafers 508 and chips 510. More specifically, the wafer and chip security manager 504 may generate a correction dataset 512 that, when fed into the fabrication tool 506, results in shifts-applied to the security mask 514 that encode characters into the circuitry of the chips 510. The security masks 514 may be similar to the security masks 206. Further, the correction datastore 512 may be similar to the SMPC datastore 204. The shifts specified in the correction datastore 512 may represent shifts from product masks 516, which may be similar to product masks 202. In some embodiments, the fabrication tool 506 may print the security masks 514 on the chips 510 and encompassing wafer 508. Additionally, the fabrication tool 506 may print surrogate targets 520 on the wafers 508. The surrogate targets 520 may be similar to the surrogate targets 408.

Further, in some embodiments of the present disclosure, the wafer and chip security manager 504 may validate the identification of provided wafers 508 and chips 510 based on associated wafer and chip inline metrology data 518. The wafer and chip inline metrology data 518 can include inline metrology measures that represent shifts in security masks 514 from associated product masks 516 and/or surrogate targets 520. According to some embodiments of the present disclosure, the wafer and chip security manager 504 can perform data modelling that maps the wafer and chip inline metrology data 518 to characters of a secure identifier, such as a WaferID, ChipID and the like. Further, the wafer and chip security manager 504 can present the secure identifier on a user interface, or provide the identifier to another system for validation. Additionally, the wafer and chip security manager 504 can provide an alert, or other notification, if a wafer 508 and/or chip 510 passes or fails validation.

Figure 6:
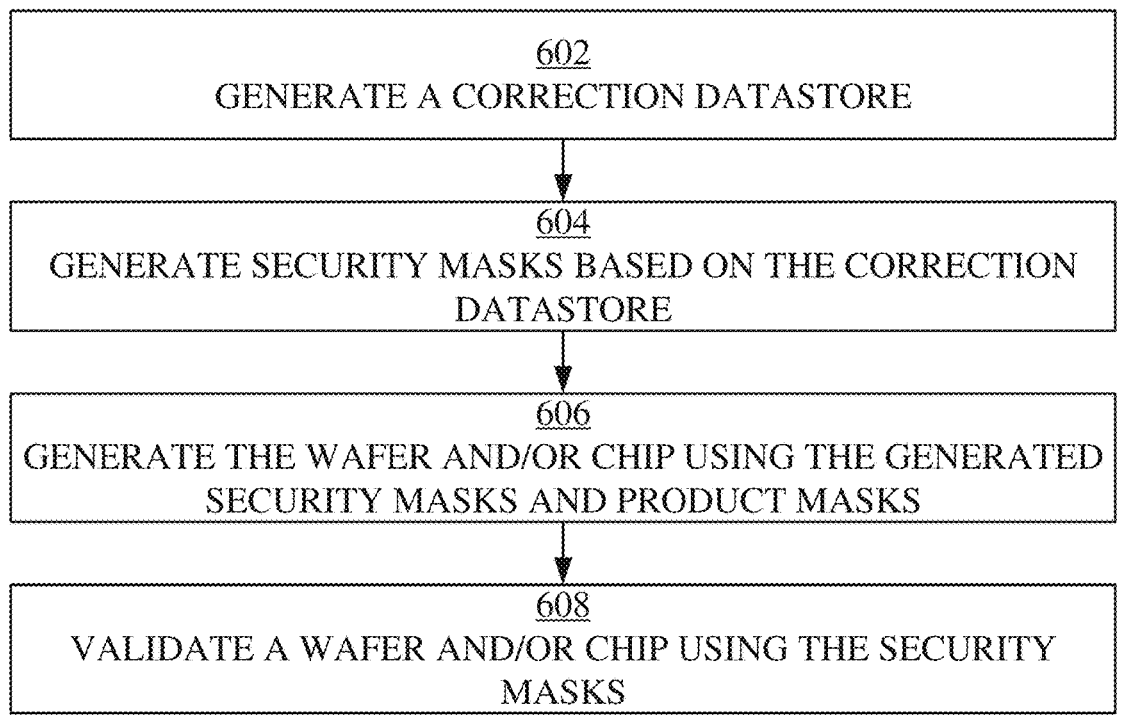
FIG. 6 is a process flow chart of a method for secure identification of wafer and chip, in accordance with some embodiments of the present disclosure.

FIG. 6 is a process flow chart of a method 600 for secure identification of wafer and chip, in accordance with some embodiments of the present disclosure. In some embodiments, a wafer and chip security manager, such as the wafer and chip security manager 504 described with respect to FIG. 5, can perform the method 600. Additionally, a fabrication tool, such as the fabrication tool 506 may perform the method 600.

At operation 602, the wafer and chip security manager 504 may generate a correction datastore, such as the correction datastore 512. Generating the correction datastore, can include translating a unique identifier to a series of positional shifts in predetermined magnitudes from associated product masks 516 and/or surrogate targets 520. The wafer and chip security manager 504 may use a predetermined algorithm and data modeling methods to map the magnitudes to characters in a unique identifier.

At operation 604, the fabrication tool 506 may generate security masks 514 based on the correction datastore 512. In some embodiments of the present disclosure, the additional marks of the security mask are pre-shifted on the same piece of glass as the product mask. Alternatively, the security marks are on a second piece of glass which is shifted (using process corrections, such as CPE) at exposure (fabrication). Thus, using either technique, the generated security masks may include corresponding overlays that represent the shifts indicated in the correction datastore 512.

At operation 606, the fabrication tool 506 may generate the wafer 508 and/or chip 510 using the generated security masks 514 and product masks 516.

At operation 608, the wafer and chip security manager 504 may validate a wafer 508 and/or chip 510 using the security masks 514. In this example, the wafer 508 and/or chip 510 to be validated may be presumed generated according to operations 602 through 606. If this wafer and/or chip 510 does not include security masks 514, the wafer and chip security manager 504 may determine the wafer 508 and/or chip 510 is not valid. For example, a foundry may generate a wafer 508 having security masks encoding the WaferID. Further, the foundry may ship the wafer 508 to another foundry for further fabrication. Upon return to the originating foundry, it may be possible to use inline metrology to identify security masks 514 in the wafer 508 and determine the magnitudes of shifts in these security masks 514. In some embodiments of the present disclosure, these determined magnitudes may be stored in wafer and chip inline metrology data 518. Accordingly, the wafer and chip security manager 504 may use the predetermined data modeling algorithm to map the wafer and chip inline metrology data 518 to characters in an identifier. Further, the wafer and chip security manager 504 may provide a user interface that presents the determined identifier. Alternatively, the wafer and chip security manager 504 may validate the determined identifier against a database or other automated system. In such embodiments, the wafer and chip security manager 504 may provide an alert for invalid identifiers.

Figure 7:
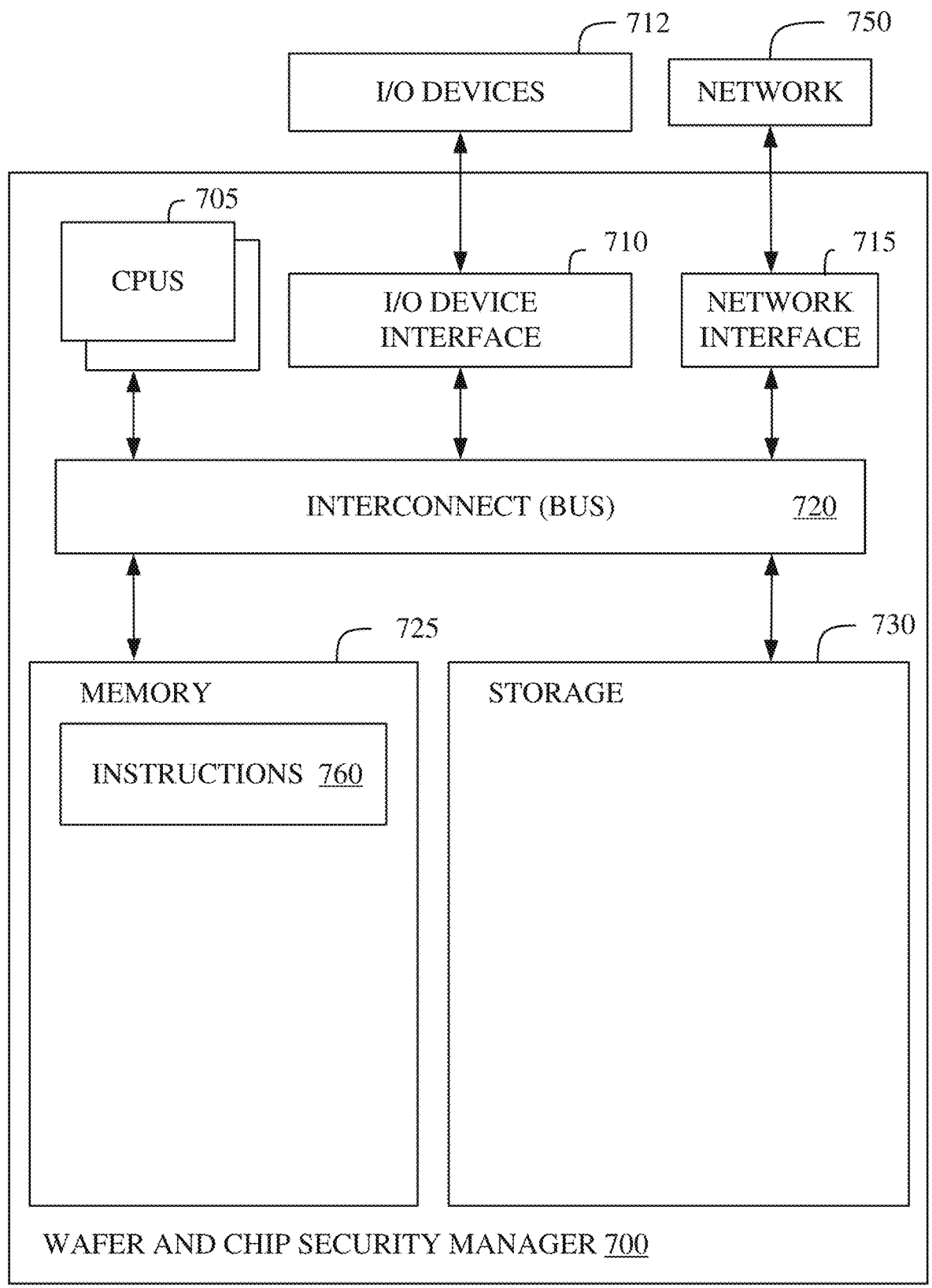
FIG. 7 is a block diagram of an example wafer and chip security manager, in accordance with some embodiments of the present disclosure.

FIG. 7 is a block diagram of an example wafer and chip security manager 700, in accordance with some embodiments of the present disclosure. In various embodiments, the wafer and chip security manager 700 is similar to the wafer and chip security manager 504 and can perform the method described in FIG. 6 and/or the functionality discussed in FIGS. 1, 2A, 2B, and 3-5. In some embodiments, the wafer and chip security manager 700 provides instructions for the aforementioned methods and/or functionalities to a client machine such that the client machine executes the method, or a portion of the method, based on the instructions provided by the wafer and chip security manager 700. In some embodiments, the wafer and chip security manager 700 comprises software executing on hardware incorporated into a plurality of devices.

The wafer and chip security manager 700 includes a memory 725, storage 730, an interconnect (e.g., BUS) 720, one or more CPUs 705 (also referred to as processors 705 herein), an I/O device interface 710, I/O devices 712, and a network interface 715.

Each CPU 705 retrieves and executes programming instructions stored in the memory 725 or the storage 730. The interconnect 720 is used to move data, such as programming instructions, between the CPUs 705, I/O device interface 710, storage 730, network interface 715, and memory 725. The interconnect 720 can be implemented using one or more busses. The CPUs 705 can be a single CPU, multiple CPUs, or a single CPU having multiple processing cores in various embodiments. In some embodiments, a CPU 705 can be a digital signal processor (DSP). In some embodiments, CPU 705 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 725 is generally included to be representative of a random access memory (e.g., static random access memory (SRAM), dynamic random access memory (DRAM), or Flash). The storage 730 is generally included to be representative of a non-volatile memory, such as a hard disk drive, solid state device (SSD), removable memory cards, optical storage, and/or flash memory devices. Additionally, the storage 730 can include storage area-network (SAN) devices, the cloud, or other devices connected to the wafer and chip security manager 700 via the I/O device interface 710 or to a network 750 via the network interface 715.

In some embodiments, the memory 725 stores instructions 760. However, in various embodiments, the instructions 760 are stored partially in memory 725 and partially in storage 730, or they are stored entirely in memory 725 or entirely in storage 730, or they are accessed over a network 750 via the network interface 715.

Instructions 760 can be processor-executable instructions for performing any portion of, or all, any of the method described in FIG. 6 and/or the functionality discussed in FIGS. 1, 2A, 2B, and 3-5.

In various embodiments, the I/O devices 712 include an interface capable of presenting information and receiving input. For example, I/O devices 712 can present information to a listener interacting with wafer and chip security manager 700 and receive input from the listener.

The wafer and chip security manager 700 is connected to the network 750 via the network interface 715. Network 750 can comprise a physical, wireless, cellular, or different network.

In some embodiments, the wafer and chip security manager 504 can be a multi-user mainframe computer system, a single-user system, or a server computer or similar device that has little or no direct user interface but receives requests from other computer systems (clients). Further, in some embodiments, the wafer and chip security manager 504 can be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary wafer and chip security manager 504. In some embodiments, however, individual components can have greater or lesser complexity than as represented in FIG. 5, components other than or in addition to those shown in FIG. 5 can be present, and the number, type, and configuration of such components can vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system comprising:
   a wafer comprising a plurality of computer processing chips, wherein each of the computer processing chips comprises:
      a product mask configured to perform one or more functions of the plurality of computer processing chips; and
      a security mask comprising a dummy mask, wherein the security mask is configured to represent a unique identifier, and wherein the security mask is disposed in a predetermined shift with respect to the product mask, and wherein a magnitude of the predetermined shift represents a character of the unique identifier.

2. The system of claim 1, wherein the security mask is printed on the wafer.

3. The system of claim 1, wherein the product mask is printed on a same reticle as the security mask.

4. The system of claim 1, wherein the product mask is printed on a different reticle than the security mask.

5. The system of claim 1, wherein the unique identifier comprises a wafer identifier.

6. The system of claim 1, wherein the unique identifier comprises a chip identifier.

7. A method comprising:
   generating a correction datastore indicating a plurality of shifts in magnitude in a corresponding plurality of shifts, wherein the plurality of shifts in magnitude represent a corresponding plurality of characters that uniquely identify hardware comprising a computer processing chip;
   generating a plurality of security masks based on a correction file, using a correction process for the computer processing chip, wherein the generated plurality of security masks comprise a corresponding plurality of overlays representing the plurality of shifts in magnitude with respect to a corresponding plurality of product masks for the computer processing chip; and
   generating the computer processing chip using the plurality of security masks and the plurality of product masks.

8. The method of claim 7, further comprising determining:
   a new plurality of shifts in magnitude based on an inline metrology on a chip associated with the computer processing chip; and performing modeling to determine a mapping between the new plurality of shifts in magnitude and a new plurality of characters.

9. The method of claim 8, further comprising:

determining that the new plurality of characters match the corresponding plurality of characters that uniquely identify the hardware; and providing a notification that the chip associated with the computer processing chip has a valid identification based on the determination.

10. The method of claim 8, further comprising:

determining that the new plurality of characters do not match the corresponding plurality of characters that uniquely identify the hardware; and providing a notification that the chip associated with the computer processing chip does not have a valid identification based on the determination.

11. The method of claim 7, further comprising:

determining that a chip associated with the computer processing chip does not comprise the plurality of security masks; and providing a notification that the chip associated with the computer processing chip does not have a valid identification based on the determination.

12. The method of claim 7, wherein the correction datastore comprises a CPE correction set.

13. The method of claim 7, wherein the correction process is selected from a group consisting of correction per exposure, linear process corrections, and high order process corrections.

14. A computer program product comprising one or more computer readable storage media, and program instructions collectively stored on the one or more computer readable storage media, the program instructions comprising instructions configured to cause one or more processors to perform a method comprising:

generating a correction datastore indicating a plurality of shifts in magnitude in a corresponding plurality of shifts, wherein the plurality of shifts in magnitude represent a corresponding plurality of characters that uniquely identify hardware comprising a computer processing chip;

generating a plurality of security masks based on a correction file, using a correction process for the computer processing chip, wherein the generated plurality of security masks comprise a corresponding plurality of overlays representing the plurality of shifts in magnitude with respect to a corresponding plurality of product masks for the computer processing chip; and generating the computer processing chip using the plurality of security masks and the plurality of product masks.

15. The computer program product of claim 14, the method further comprising determining:

a new plurality of shifts in magnitude based on an inline metrology on a chip associated with the computer processing chip; and performing modeling to determine a mapping between the new plurality of shifts in magnitude and a new plurality of characters.

16. The computer program product of claim 15, the method further comprising:

determining that the new plurality of characters match the corresponding plurality of characters that uniquely identify the hardware; and providing a notification that the chip associated with the computer processing chip has a valid identification based on the determination.

17. The computer program product of claim 15, the method further comprising:

determining that the new plurality of characters do not match the corresponding plurality of characters that uniquely identify the hardware; and providing a notification that the chip associated with the computer processing chip does not have a valid identification based on the determination.

18. The computer program product of claim 14, the method further comprising:

determining that a chip associated with the computer processing chip does not comprise the plurality of security masks; and providing a notification that the chip associated with the computer processing chip does not have a valid identification based on the determination.

19. The computer program product of claim 14, wherein the correction datastore comprises a CPE correction set.

20. The computer program product of claim 14, wherein the correction process is selected from a group consisting of correction per exposure, linear process corrections, and high order process corrections.

* * * * *